United States Patent
Müller et al.

(10) Patent No.: US 6,929,297 B2
(45) Date of Patent: Aug. 16, 2005

(54) MOTOR-VEHICLE BUMPER ASSEMBLY

(75) Inventors: Oliver Müller, Paderborn (DE); Claus Hübel, Paderborn (DE); Dariusz Straznikiewicz, Paderborn (DE)

(73) Assignee: Benteler Automobiltechnik GmbH, Paderborn (DE)

(*) Notice: Subject to any disclaimer, the term of this patent is extended or adjusted under 35 U.S.C. 154(b) by 0 days.

(21) Appl. No.: 10/809,273

(22) Filed: Mar. 25, 2004

(65) Prior Publication Data

US 2004/0207217 A1 Oct. 21, 2004

(30) Foreign Application Priority Data

Apr. 1, 2003 (DE) .......................................... 103 14 905

(51) Int. Cl.$^7$ ............................................. B60R 19/34
(52) U.S. Cl. ...................................... 293/133; 293/132
(58) Field of Search ................................ 296/132, 133; 293/132, 133

(56) References Cited

U.S. PATENT DOCUMENTS

| | | | |
|---|---|---|---|
| 4,190,276 A | * | 2/1980 | Hirano et al. ............... 293/133 |
| 5,876,077 A | | 3/1999 | Miskech |
| 6,174,009 B1 | * | 1/2001 | McKeon .................... 293/133 |
| 6,299,226 B1 | | 10/2001 | Kroning |
| 6,398,275 B1 | | 6/2002 | Hartel |
| 6,439,650 B2 | | 8/2002 | Artner |
| 6,520,552 B2 | | 2/2003 | Schroter |
| 6,648,385 B2 | * | 11/2003 | Frank ......................... 293/133 |
| 2001/0013706 A1 | * | 8/2001 | Artner ........................ 293/133 |

FOREIGN PATENT DOCUMENTS

| | | |
|---|---|---|
| DE | 199 58 996 | 6/2001 |
| DE | 100 43 880 | 4/2002 |
| DE | 101 10 332 | 9/2002 |
| JP | 0 2175 452 | 12/1988 |
| JP | 191 874 | 7/2001 |

* cited by examiner

*Primary Examiner*—Jason Morrow
(74) *Attorney, Agent, or Firm*—Herbert Dubno; Andrew Wilford

(57) ABSTRACT

A motor-vehicle bumper assembly has a transverse rigid and U-shaped rail having an inner wall closely juxtaposed in a normal motor-vehicle travel direction with a frame of a motor vehicle, an outer wall spaced farther from the frame than the inner wall, and a horizontal wall extending between the inner and outer walls. Two crush cans spaced transversely apart support the rail on the motor-vehicle frame. Each can has a first U-section element extending in the direction and having an inner end fixed to the frame and an outer end fixed to the inner rail wall and a second U-section element nested with and mostly vertically offset from the respective first element and having an inner end fixed to the frame and an outer end extending past the inner rail wall. An outer mounting plate is fixed to the second-element outer end and to the outer rail wall.

8 Claims, 6 Drawing Sheets

MOTOR-VEHICLE BUMPER ASSEMBLY

FIELD OF THE INVENTION

The present invention relates to a motor-vehicle bumper assembly. More particularly this invention concerns such an assembly comprised of a bumper-forming or -carrying rail and crushable mounts for securing the rail to the vehicle frame.

BACKGROUND OF THE INVENTION

A standard bumper assembly mounted on the front or rear of a motor vehicle comprises a relatively rigid and quite strong rail extending horizontally and transversely, that is cross-wise to the normal motor-vehicle travel direction and normally carrying the plastic or sheet-metal elements forming the visible parts of the bumper system. This rail is secured to the motor vehicle frame by at least two mounts that themselves therefore extend longitudinally, that is parallel to the normal motor-vehicle travel direction, and that have front ends fixed to the rail and rear ends fixed to the motor-vehicle frame. It is known to provide towing points, typically sockets to which a tow line can be attached, on the mounts. These mounts are sacrificial and thus are constituted as so-called crush cans so that, in the event of a low-speed collision, they deform longitudinally, confining the damage to these elements. Thus JP 02175452 describes how they can be formed with cross-wise grooves so that, when crushed longitudinally, they deform uniformly and absorb considerable energy.

In U.S. Pat. No. 6,439,650 of Artner the crush cans each comprise two vertical side walls, a horizontal top wall, and a horizontal bottom wall, with the top and bottom walls horizontally bridging upper and lower edges of the side walls. The top wall is generally level with and extends rearward or forward, depending on whether this is the front or rear bumper, from an upper surface of the rail, and the bottom wall is similarly generally level with and extends rearward or forward from a lower surface of the rail. Thus the crush cans are in effect wholly tucked in behind the rail.

The problem with this system is that the space between the stiff rail and the vehicle frame is fairly limited. In addition it is frequently uses as a flow path for cooling air into or out of the vehicle's engine. Thus the crush cans cannot be too big, as on the one hand there is insufficient room to accommodate something big, and on the other hand the space cannot be filled up and blocked. Attempts to reduce the size of the crush cans leads, however, to reductions in the strength of the cans, so that they cannot meet, for instance, the European low-speed crash requirements which are at 16 km/h.

OBJECTS OF THE INVENTION

It is therefore an object of the present invention to provide an improved motor-vehicle bumper assembly.

Another object is the provision of such an improved motor-vehicle bumper assembly which overcomes the above-given disadvantages, that is which is extremely compact yet which offers appropriate crash resistance.

SUMMARY OF THE INVENTION

A motor-vehicle bumper assembly has according to the invention a horizontally and transversely extending rigid and generally U-shaped rail having a transversely extending inner wall closely juxtaposed in a normal motor-vehicle travel direction with a frame of a motor vehicle, a transversely extending outer wall turned away from the motor-vehicle frame and spaced farther therefrom than the inner wall, and a horizontal wall extending between lower edges of the inner and outer walls. Two crush cans spaced transversely apart support the rail on the motor-vehicle frame. Each can has a first U-section element extending in the direction and having an inner end fixed to the frame and an outer end fixed to the inner rail wall and a second U-section element nested with and mostly vertically offset from the respective first element and having an inner end fixed to the frame and an outer end extending longitudinally past the inner rail wall. The first element lies mainly between horizontal planes extending in the direction from upper and lower edges of the inner wall while the second element lies mainly above a region defined between these horizontal planes. An outer mounting plate is fixed to the second-element outer end and to the outer rail wall.

Thus with this system the rail has a substantially shorter vertical dimension than its mounts, the crush cans. Hence the assembly can fit easily within the normally inwardly open U-section shroud covering the rail. In addition such a crush can does not substantially block the space between the rear of the rail and the front of the motor-vehicle frame, so that air flow through this space is not significantly impeded. Since the crush cans are connected to both the outer and inner walls of the rail, the rail and its mounts are very solidly integrated with each other. The second U-profile of each can is longer than the first one, so that it has enhanced crush resistance and can be deformed more before the rail bottoms on the vehicle frame. The system is ideal for a sports-utility vehicle.

According to the invention the rail is formed by a downwardly open upper U-profile having a pair of legs forming the inner and outer walls and a bight joining the legs and forming the horizontal wall and a second profile fixed between the legs and forming another horizontal wall, although of course the system could be oriented differently, with for instance the second profile forming the inner wall and the bight forming the outer wall. The second profile is also of U-section and downwardly open. Such a structure, which is normally made of hot-rolled steel, is extremely strong, and since the two profiles are downwardly open, will not catch water so is not a corrosion risk.

Each of the mounting plates is provided according to the invention with a tow socket. This socket is therefore connected via the respective crash can to the motor-vehicle frame, but will in no way interfere with deformation of the structure in an accident.

The U-section profiles are ribbed for best crush effect and the plates are each vertical. Furthermore the U-profiles of each can are open toward each other and the first profile of each can is below the respective second profile.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
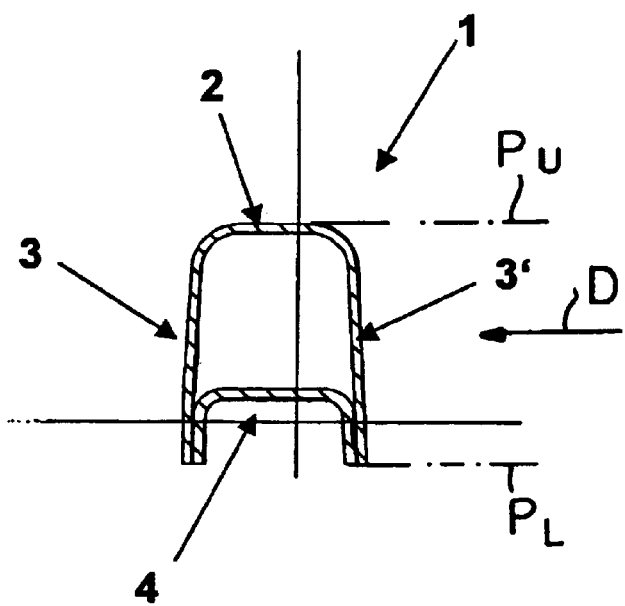
FIG. 1 is a cross section through the main rail of the bumper assembly.

As seen in FIG. 1 a standard bumper rail 1 has a generally planar and horizontal top wall 2, a vertical outer front wall 3, a vertical inner or rear wall 3', and a bottom wall 4. All the walls 2, 3, and 4 extend transversely of a standard motor-vehicle travel direction D. The top wall 2 actually is formed as a bight of a downwardly open hot-rolled steel U-profile whose legs form the walls 3 and 3'. The bottom wall 4 is similarly formed by a downwardly open steel U-profile fitted between the walls 3 and 3' and welded in place to rigidify the rail 1. The upper edge of the rail 1, here defined by the bight 2 although as shown in FIGS. 9–12 other orientations are possible, defines an upper plane $P_U$ and the lower edges of the legs 3 and 3' define a lower plane $P_L$.

Figure 7:
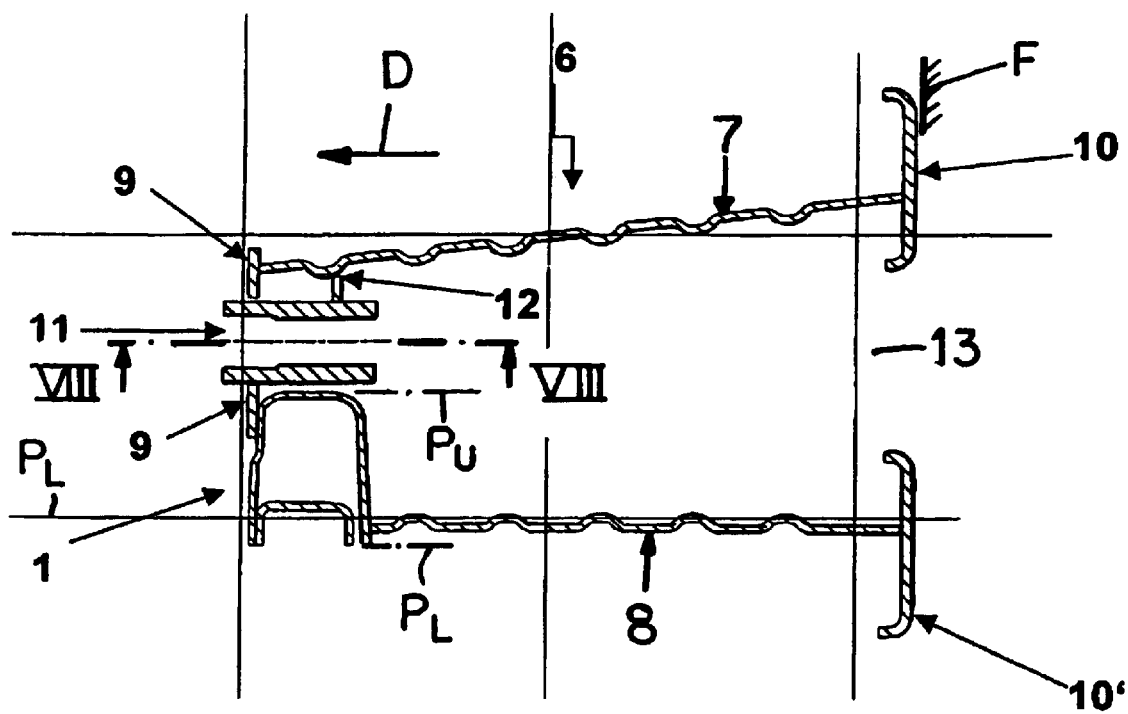
FIG. 7 is a longitudinal section through one of the crush cans or mounts of the assembly.

As shown in FIGS. 2 to 6, this rail 1 is arcuate and forms part of a bumper assembly 5 also having two identical crush cans 6 and 6' that support it on a motor-vehicle frame indicated schematically at F in FIG. 7. The parts of the crush cans 6 and 6' are identified with the same numerals, with primes on those of the can 6'.

The can 6, which as mentioned above is identical to the can 6', is comprised of a downwardly open upper U-profile 7 and an upwardly open U-profile 8 that are both formed with grooves or corrugations so that they can be crushed longitudinally. The upper profile 7 fits over the lower profile 8 with its outside (to the left for the left-hand can 6 and to the right for the right-hand can 6') leg outside the lower profile 8 and its inside leg inside it. The rear ends of both profiles 7 and 8 are welded to a rear mounting plate 10 formed with a central hole 13. The front end of the lower upper profile 7 is welded to a vertical mounting plate 9 secured at 90 to the front wall 3 of the rail 1 so that this profile 7 extends completely over the rail 11 and in fact its lower edge sits atop the rail's top wall 2. Thus the profile 7 lies mainly above the plane $P_u$ and the lower profile lies mainly between the planes $P_U$ and $P_L$. The lower profile has an outer or front end welded to the rear or inner wall 3' of the rail 1, so that it is longitudinally somewhat shorter than the upper profile 7.

Figure 8:
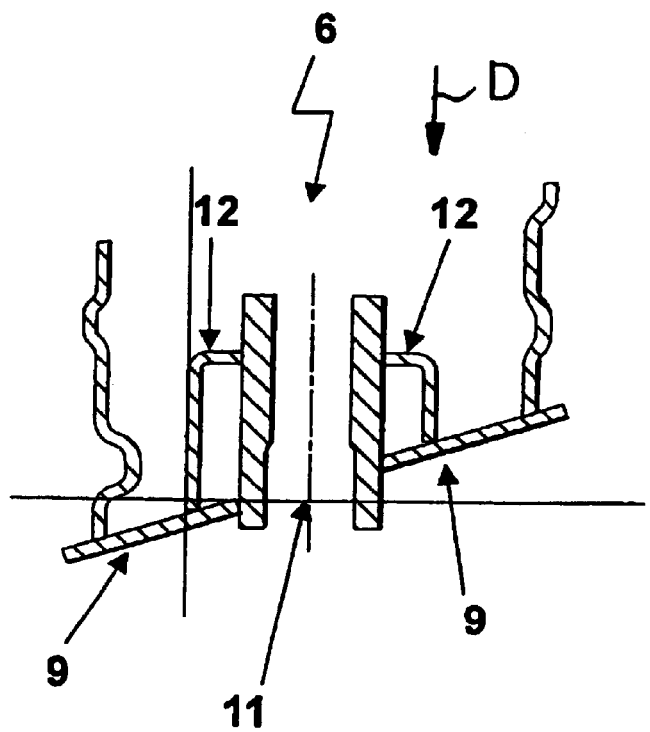
FIG. 8 is a cross section taken along line VIII—VIII of FIG. 7.
Figure 2:
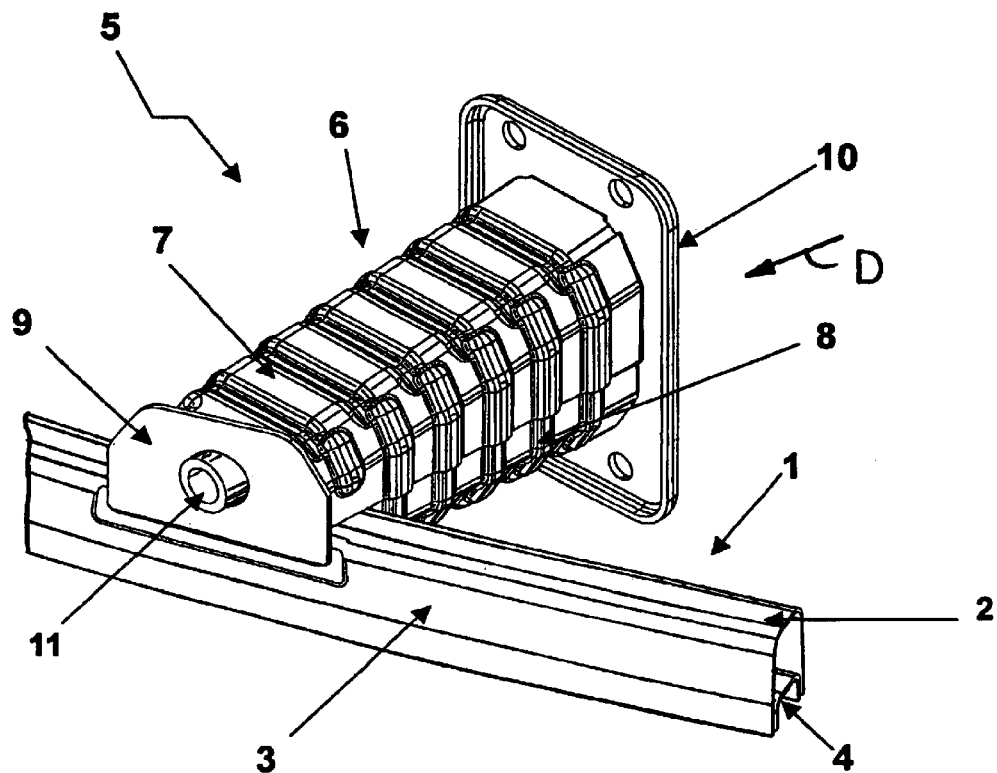
FIG. 2 is a perspective view from above and the side of a portion of the assembly.
Figure 3:
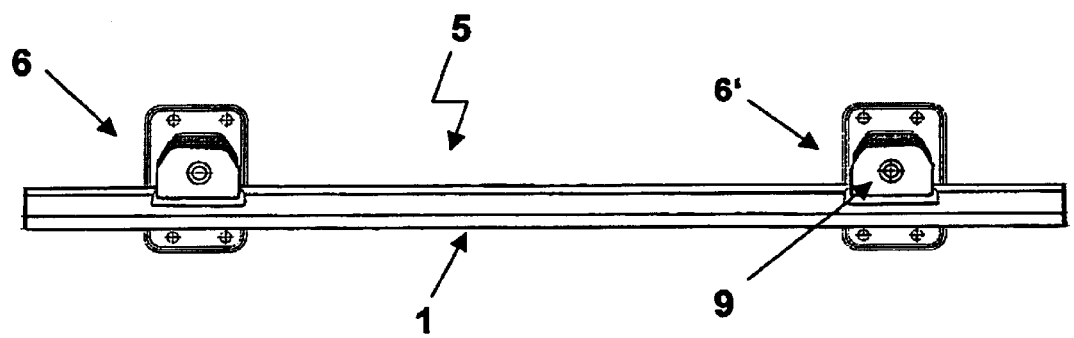
FIG. 3 is a front view of the entire assembly.
Figure 4:
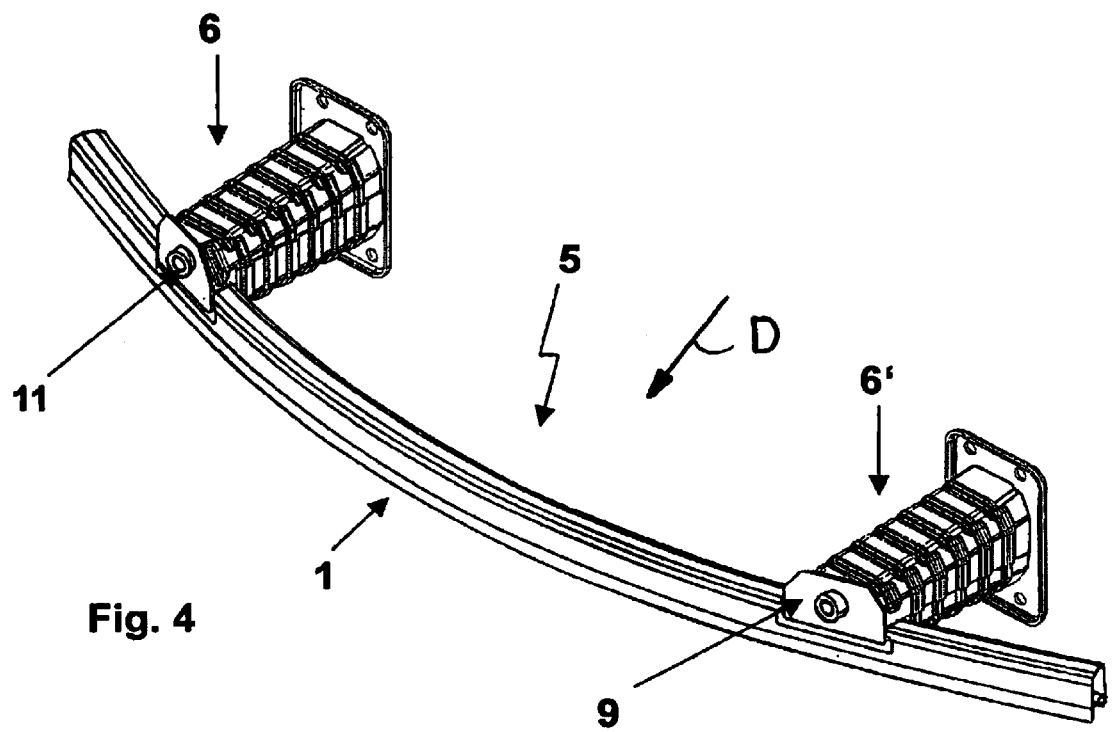
FIG. 4 is a perspective view from above and the side of the entire assembly.
Figure 5:
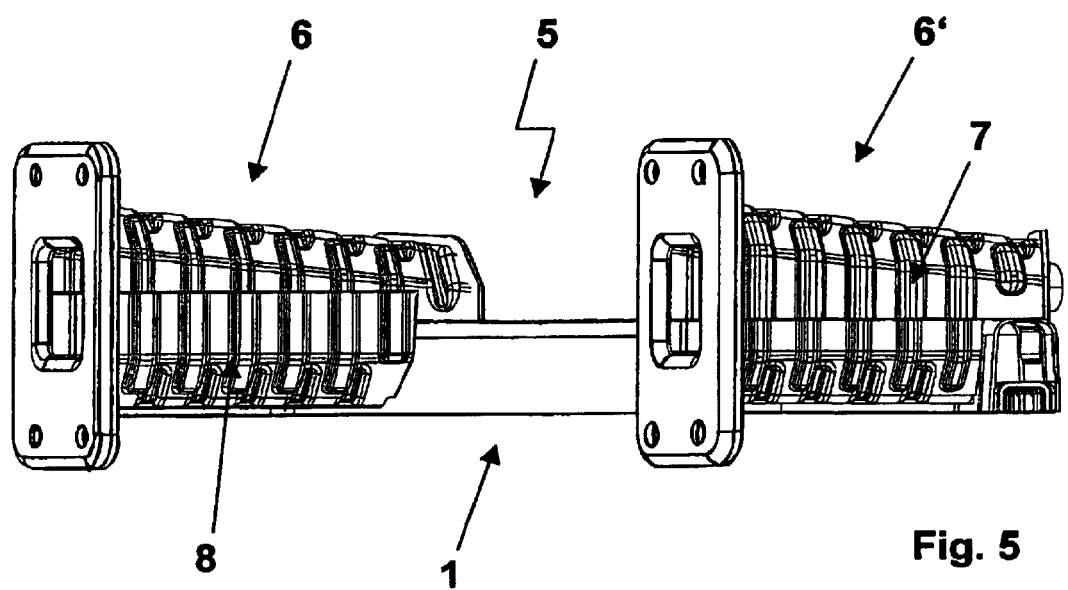
FIG. 5 is a perspective view from the side of the entire assembly.
Figure 6:
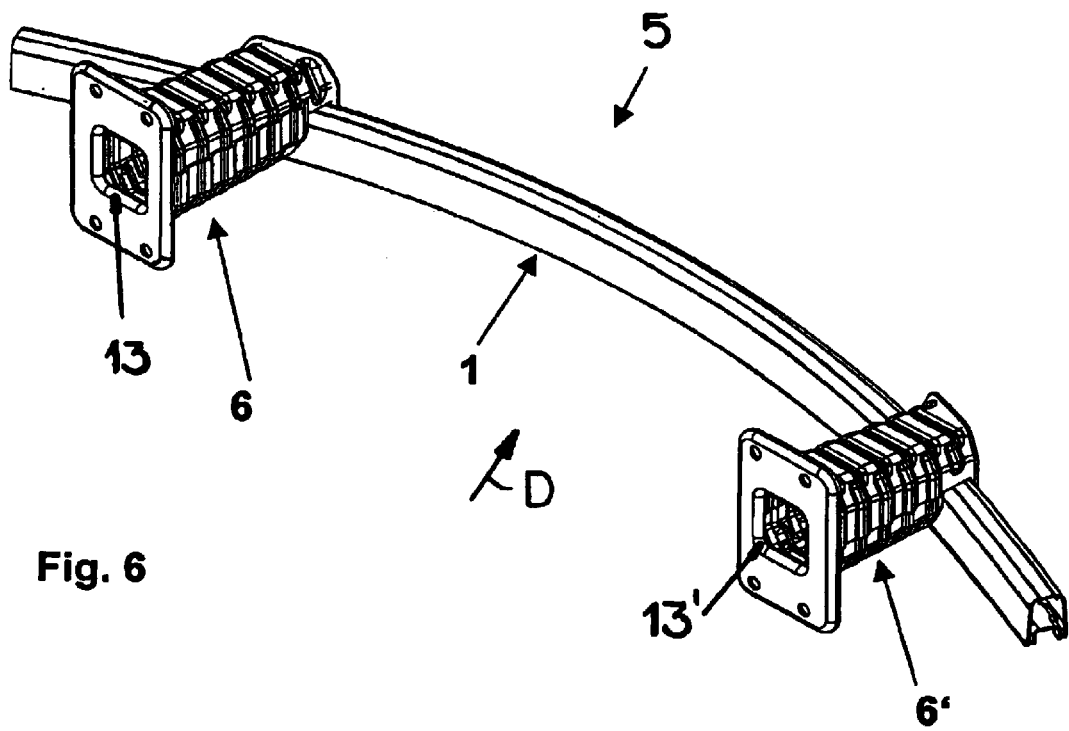
FIG. 6 is a perspective view from the rear of the entire assembly.

A towing socket 11 is set in the plate 9 and secured therein by a mounting clip or bracket 12 as shown in FIGS. 7 and 8. As the rail 1 is curved and the towing socket 11 must extend perfectly parallel to the direction D, the bracket 12 sets the socket 11 at an angle to the plate 9 as shown in FIG. 8.

Figure 10:
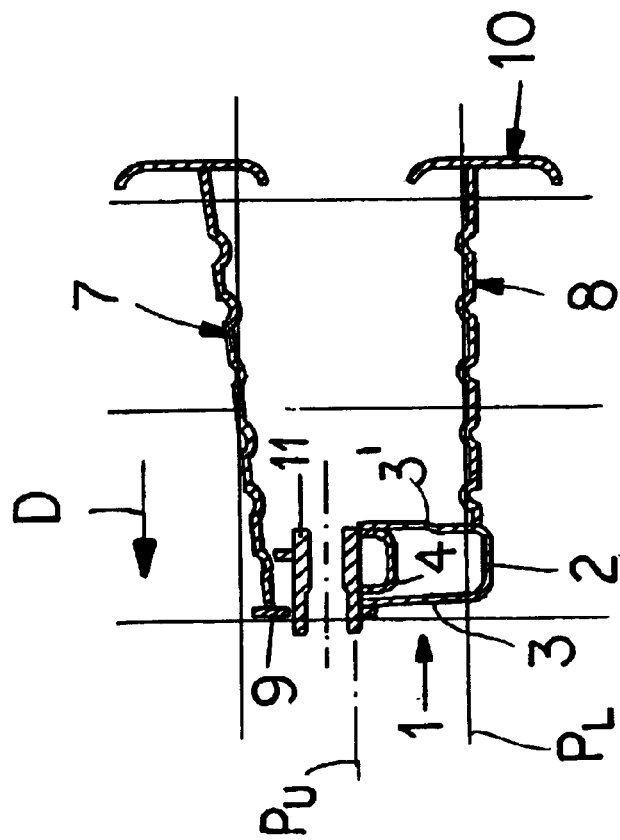
FIGS. 9, 10, 11, and 12 are small-scale views like FIG. 7 showing alternative arrangement in accordance with the invention.
Figure 9:
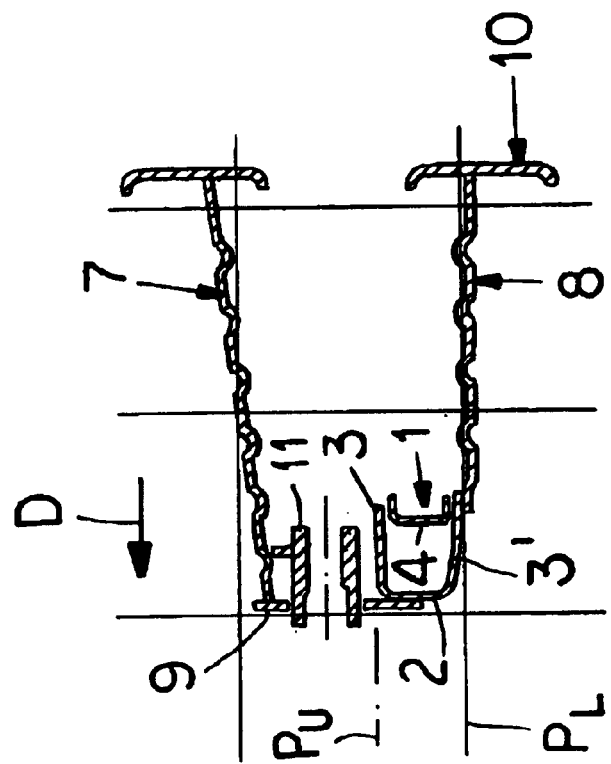

FIGS. 9 through 12 show variations on the system. In FIG. 9 the rail 1 is oriented with the leg 3 as the top wall but the lower profile 8 is secured to the wall 4 which is the inner wall of the rail 1 and the plate 9 is secured to the bight 9 with the socket 1 above the rail 1. In FIG. 10 the bight 2 is the bottom wall, the lower profile 8 is secured to the leg 3' which is the inner wall, the plate 9 is secured to the leg 3 which is the outer wall, and the socket 11 is located as in FIGS. 7 and 9 above the rail 1.

Figure 12:
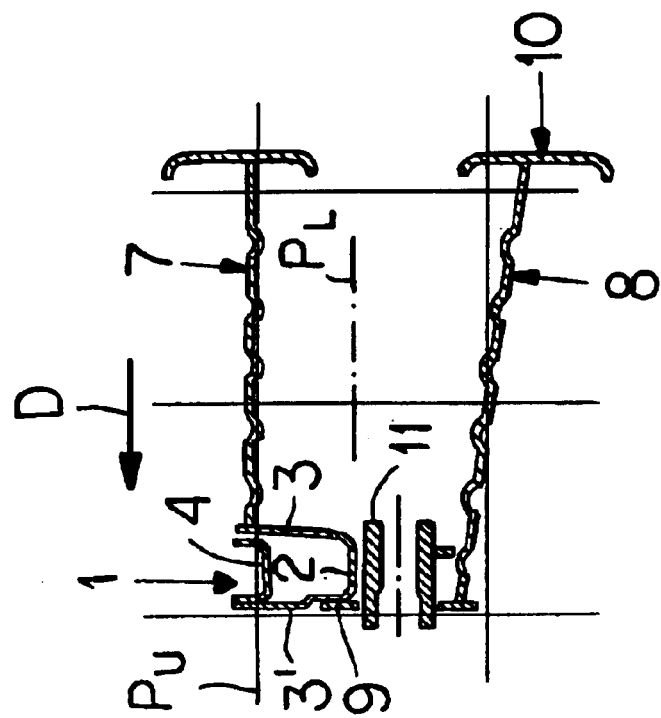
Figure 11:
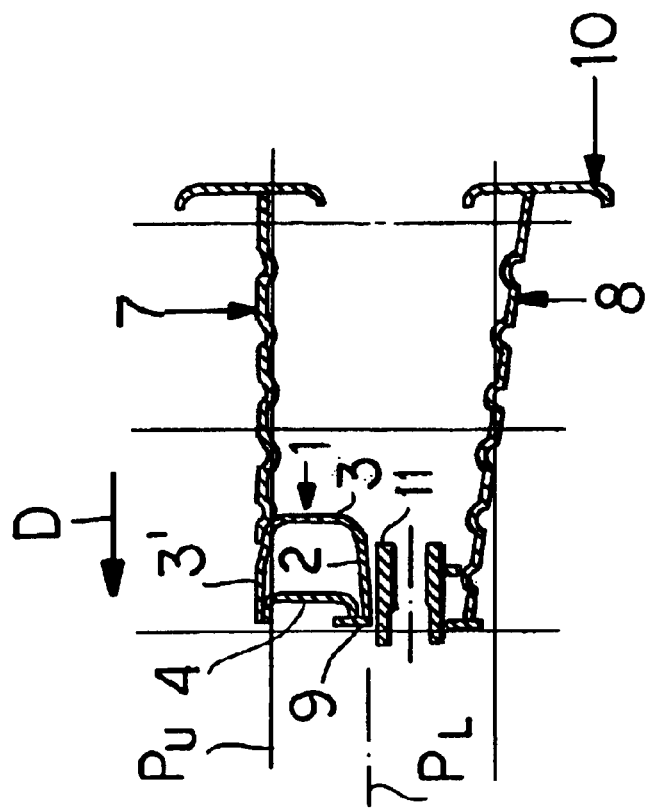

In FIG. 11 the lower profile 8 extends past the rail 1 and is secured to the plate 9 which is secured in turn to the element 4 which here is the outer wall, while the upper profile 7 is secured to the inner wall formed by the bight 2 and the socket 11 lies below the rail 1. In FIG. 12 the socket 11 is also below the rail 1, but the upper profile 7 is secured to the leg 3 which is the inner wall, the profile 8 extends to the leg 3' which forms the outer wall and to which the plate 9 is attached.

FIGS. 9–12 make clear that in every case one of the profiles 7 or 8 lies between the planes $P_U$ and $P_L$ and the other one is vertically offset from the region between these planes $P_U$ and $P_L$.

We claim:

1. A motor-vehicle bumper assembly comprising:

a horizontally and transversely extending rigid and generally U-shaped rail having a transversely extending inner wall closely juxtaposed in a normal motor-vehicle travel direction with a frame of a motor vehicle, a transversely extending outer wall turned away from the motor-vehicle frame and spaced farther therefrom than the inner wall, and a horizontal wall extending horizontally between edges of the inner and outer walls; and two crush cans spaced transversely apart and each having
a first U-section element extending in the direction and having an inner end fixed to the frame and en outer end fixed to the inner rail wall, the first element lying mainly between horizontal planes extending in the travel direction from upper and lower edges of the inner rail wall;
a second U-section element nested with and mostly vertically offset from the respective first element and having an inner end fixed to the frame and an outer end extending longitudinally past the inner rail wall, the second element being mainly vertically offset from a region between the horizontal planes, and
an outer mounting plate fixed to the second-element outer end and to the outer rail wall.

2. The motor-vehicle bumper assembly defined in claim 1 wherein the rail is formed by
a downwardly open upper U-profile having a pair of legs forming the inner and outer walls and a bight joining the legs and forming the horizontal wall and
a lower profile fixed between the legs.

3. The motor-vehicle bumper assembly defined in claim 2 wherein the lower profile is of U-section and downwardly open.

4. The motor-vehicle bumper assembly defined in claim 1 wherein each of the mounting plates is provided with a tow socket.

5. The motor-vehicle bumper assembly defined in claim 2 wherein the U-section elements are ribbed.

6. The motor-vehicle bumper assembly defined in claim 1 wherein the inner and outer walls are each vertical.

7. The motor-vehicle bumper assembly defined in claim 1 wherein the U-section elements of each can are open toward each other.

8. The motor-vehicle bumper assembly defined in claim 1 wherein the first U-section element of each can is below the respective second U-section element.

* * * * *